United States Patent
Hyodo et al.

(10) Patent No.: US 8,668,624 B2
(45) Date of Patent: Mar. 11, 2014

(54) MOTOR CONTROL DEVICE FOR WORKING VEHICLE

(75) Inventors: Koji Hyodo, Kasumigaura (JP); Masaki Yoshikawa, Kasama (JP); Kazuo Chounan, Moriya (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 253 days.

(21) Appl. No.: 13/378,445

(22) PCT Filed: Jun. 21, 2010

(86) PCT No.: PCT/JP2010/060471
§ 371 (c)(1),
(2), (4) Date: Dec. 15, 2011

(87) PCT Pub. No.: WO2010/147232
PCT Pub. Date: Dec. 23, 2010

(65) Prior Publication Data
US 2012/0094801 A1    Apr. 19, 2012

(30) Foreign Application Priority Data
Jun. 19, 2009    (JP) .................................. 2009-146200

(51) Int. Cl.
*B60W 10/04*    (2006.01)

(52) U.S. Cl.
USPC .......................................... 477/111; 477/181

(58) Field of Classification Search
USPC .................... 477/68, 52, 53, 111, 181, 107
See application file for complete search history.

(56) References Cited

U.S. PATENT DOCUMENTS

| | | | | |
|---|---|---|---|---|
| 5,339,239 A | * | 8/1994 | Manabe et al. | 705/1.1 |
| 5,620,393 A | * | 4/1997 | Minowa et al. | 477/155 |
| 5,906,560 A | * | 5/1999 | Minowa et al. | 477/97 |
| 7,865,288 B2 | * | 1/2011 | Fukushima et al. | 701/54 |
| 8,082,082 B2 | * | 12/2011 | Matsuyama | 701/50 |
| 2007/0169743 A1 | | 7/2007 | Kobayashi et al. | |
| 2009/0240406 A1 | | 9/2009 | Fukushima et al. | |
| 2012/0100959 A1 | * | 4/2012 | Hyodo et al. | 477/111 |

FOREIGN PATENT DOCUMENTS

| | | |
|---|---|---|
| JP | 2006-226255 A | 8/2006 |
| JP | 2007-170276 A | 7/2007 |
| JP | 2007-198245 A | 8/2007 |
| WO | WO 2009/054499 A1 | 4/2009 |

OTHER PUBLICATIONS

International Search Report dated Sep. 21, 2010 two (2) pages.

* cited by examiner

*Primary Examiner* — David D Le
*Assistant Examiner* — David J Hlavka
(74) *Attorney, Agent, or Firm* — Crowell & Moring LLP (57) ABSTRACT

A motor control device for a working vehicle includes: a travel drive device that transmits rotation of a motor to wheels through a torque converter; a first selection device to be operated so as to select one of a power mode and an economy mode; a second selection device that is different from the first selection device; a mode switching device that switches from the economy mode to the power mode if the second selection device is operated in a state where the economy mode has been selected by the first selection device; and a speed restriction device that, when the economy mode is set, restricts a maximum rotational speed of the motor to a lower speed side than that when the power mode is set.

8 Claims, 9 Drawing Sheets

MOTOR CONTROL DEVICE FOR WORKING VEHICLE

TECHNICAL FIELD

The present invention relates to a motor control device for a working vehicle such as a wheel loader.

BACKGROUND ART

There is a conventionally known device that can switch travel mode between power mode in which priority is given to workability and economy mode in which priority is given to fuel economy (refer to the patent literature 1). The device stated in the patent literature 1 switches the travel mode to the power mode when kickdown is instructed by a switch operation in a state where the travel mode is in the economy mode and the speed step is in the lowest speed step.

CITATION LIST

Patent Literature

[PATENT LITERATURE 1] Japanese Laid-Open Patent Publication No. 2007-170276

SUMMARY OF INVENTION

Technical Problem

However, since the device stated in the patent literature 1 switches the travel mode to the power mode in a condition where the speed step is in the lowest speed step, the device is incapable of meeting the need to temporarily provide the power during travel in the second speed in the economy mode for example.

Solution to Problem

A motor control device for a working vehicle according to a first aspect of the present invention comprises: a travel drive device that transmits rotation of a motor to wheels through a torque converter; a first selection device to be operated so as to select one of a power mode and an economy mode; a second selection device that is different from the first selection device; a mode switching device that switches from the economy mode to the power mode if the second selection device is operated in a state where the economy mode has been selected by the first selection device; and a speed restriction device that, when the economy mode is set, restricts a maximum rotational speed of the motor to a lower speed side than that when the power mode is set.

According to a second aspect of the present invention, the motor control device for a working vehicle according to the first aspect may further comprise a determination device that making a decision as to whether a mode switching condition is established in accordance with one of a vehicle state of the working vehicle and an operation on the second selection device, wherein it is preferable that the mode switching device switches from the power mode to the economy mode if the determination device makes a decision that a mode switching condition is established in a state where the power mode has been selected by an operation on the second selection device.

According to a third aspect of the present invention, the motor control device for a working vehicle according to the second aspect may further comprise a speed ratio detection device that detects a speed ratio of the torque converter, wherein: the determination device makes a decision that a mode switching condition is established if the torque converter speed ratio detected by the speed ratio detection device becomes equal to or greater than a predetermined value.

According to a fourth aspect of the present invention, in the motor control device for a working vehicle according to the second aspect, the determination device may make a decision that a mode switching condition is established if the second selection device is operated again in a state where the power mode has been set by an operation on the second selection device.

According to a fifth aspect of the present invention, in the motor control device for a working vehicle according to the second aspect, the determination device may make a decision that a mode switching condition is established if, in a state where a transmission has been set to an automatic shift mode, a shift up signal is output to the transmission.

According to a sixth aspect of the present invention, in the motor control device for a working vehicle according to the second aspect, the determination device may make a decision that a mode switching condition is established if a forward and reverse movement changeover switch, by which an instruction of any of forward, reverse, and neutral of the working vehicle is given, is operated to a neutral position.

According to a seventh aspect of the present invention, in the motor control device for a working vehicle according to the first to sixth aspects, it is preferable that the first selection device is an alternate switch provided in a driver cabin; and the second selection device is a momentary switch provided to a working operation member that outputs a drive instruction to a working actuator in accordance with an operation amount.

According to an eighth aspect of the present invention, the motor control device for a working vehicle according to the first to seventh aspects may further comprise a low-speed instruction device that instructs a speed step to be switched to a low speed side and that is separated from the second selection device.

Advantageous Effect of the Invention

According to the present invention, travel driving force can be increased primarily regardless of the speed step by switching from the economy mode to the power mode.

BRIEF DESCRIPTION OF THE DRAWINGS

FIG. 5 (*a*) is a plan view showing a structure in a driver cabin, FIG. 5 (*b*) is a view showing a structure of a main switch, and FIG. 5 (*c*) is a view showing an arrangement of sub switches.

DESCRIPTION OF EMBODIMENTS

A device for controlling a motor, engine or prime mover of a working vehicle according to an embodiment of the present invention will now be explained with reference to FIG. 1 to FIG. 9.

Figure 1:
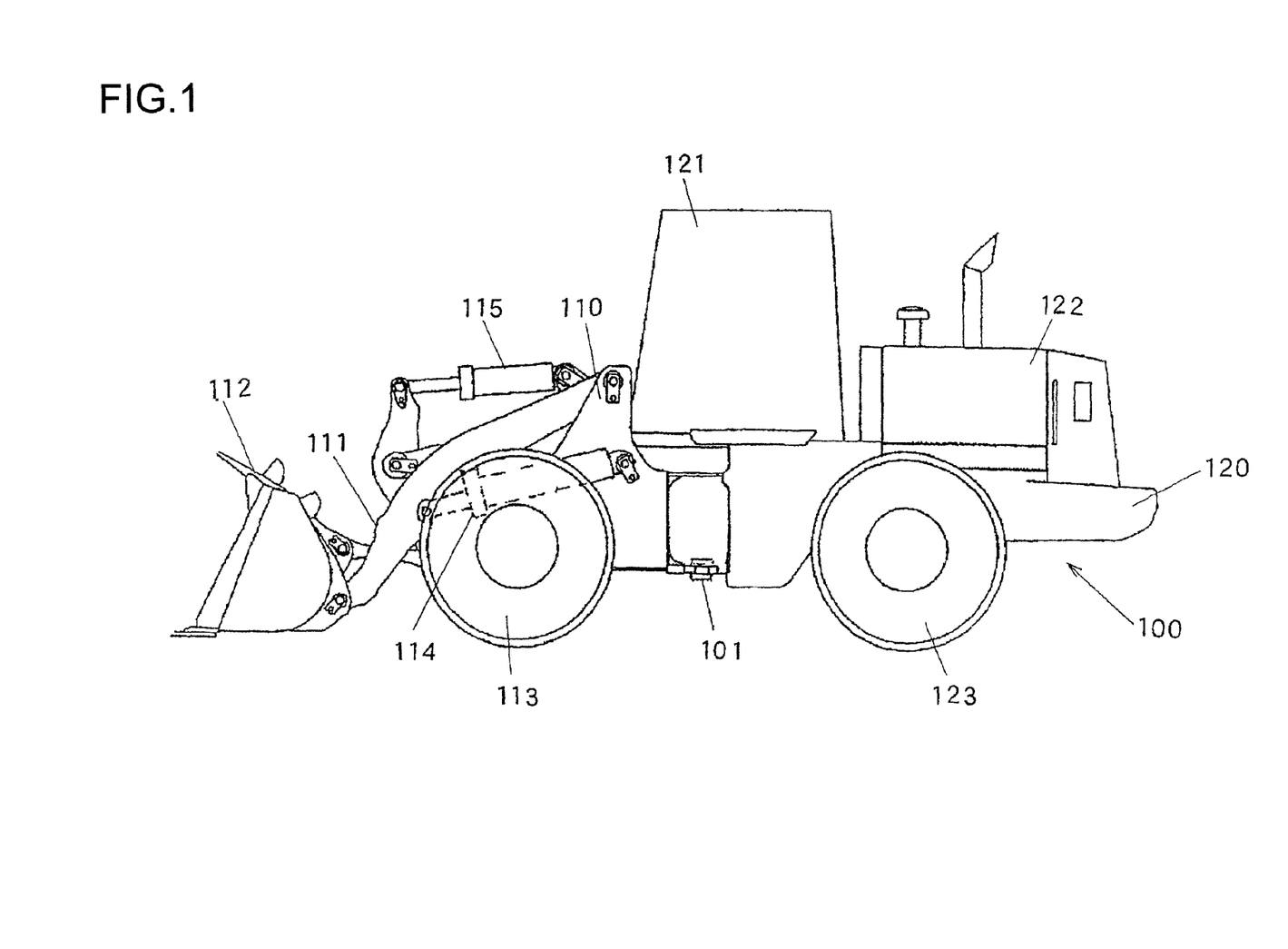
FIG. 1 is a side view of a wheel loader that is an example of a working vehicle according to an embodiment of the present invention.

FIG. 1 is a side view of a wheel loader that is an example of a working vehicle to which the motor control device according to the present embodiment is applied. A wheel loader 100 is constituted with a front body 110 that includes an arm 111, a bucket 112, tires 113, and the like and a rear body 120 that includes a driver cabin 121, an engine bay 122, tires 123, and the like. The arm 111 vertically rotates (articulates up and down) on actuation of an arm cylinder 114 and the bucket 112 vertically rotates (dumps or crowds) on actuation of a bucket cylinder 115. The front body 110 and the rear body 120 are rotatably connected with each other through a center pin 101, so that expansion and contraction of a steering cylinder (not shown in the figure) causes the front body 110 to swing side to side with respect to the rear body 120.

Figure 2:
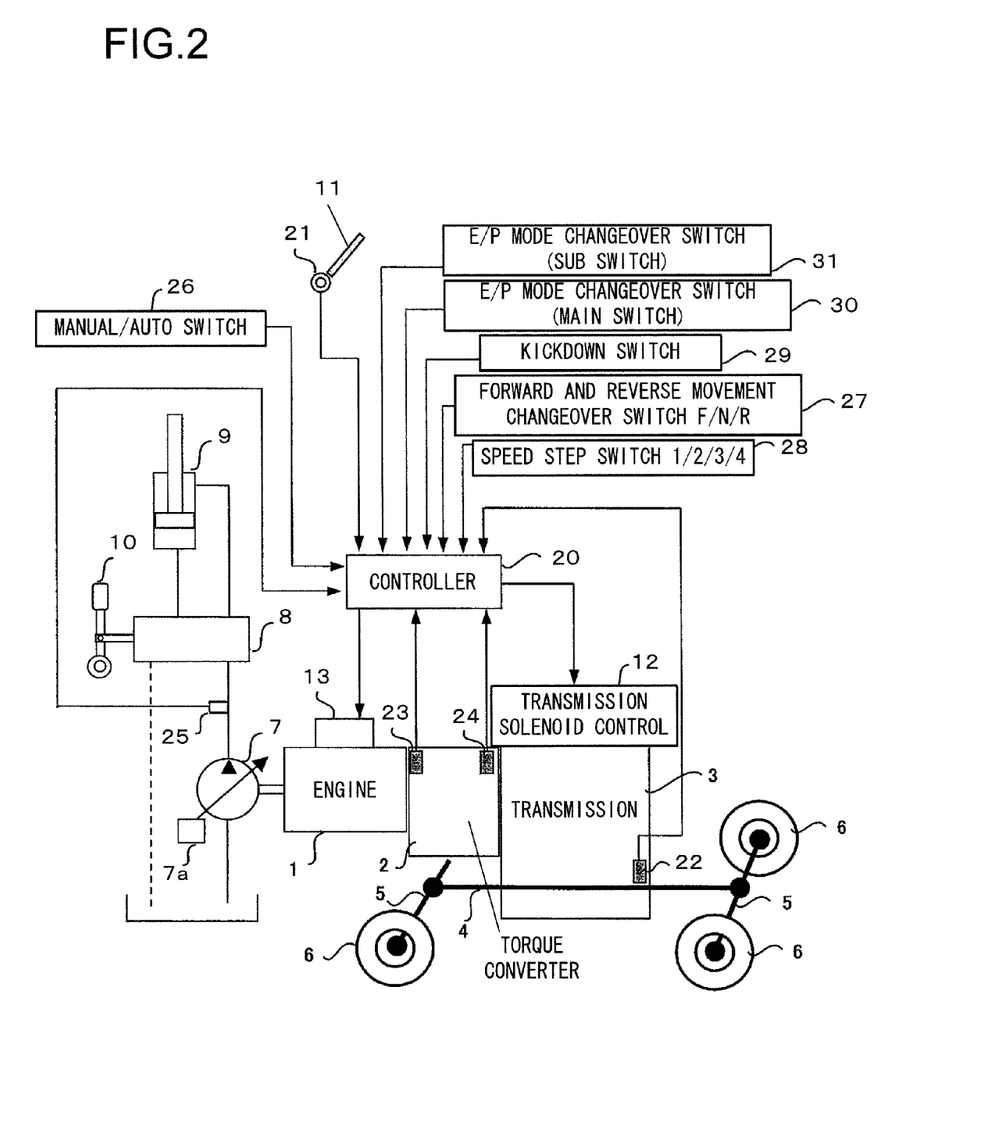
FIG. 2 is a diagram showing an outline structure of a motor control device according to an embodiment of the present invention.

FIG. 2 is a diagram showing an outline structure of the motor control device according to the present invention. An input shaft of a torque converter 2 is connected to an output shaft of an engine 1, and an output shaft of the torque converter 2 is connected to a transmission 3. The torque converter 2 is a fluid clutch device constituted with a well known impeller, a turbine, and a stator, and rotation of the engine 1 is transmitted to the transmission 3 through the torque converter 2. The transmission 3 includes hydraulic clutches that shift its speed step, so that rotation speed of the output shaft of the torque converter 2 is changed at the transmission 3. The speed-changed rotation is transmitted to tires 6 (113 and 123 of FIG. 1) through a propeller shaft 4 and axles 5 and thus the vehicle travels.

A variable displacement working hydraulic pump 7 is driven by the engine 1 so as to discharge pressure oil. Discharged oil from the hydraulic pump 7 is led to a working actuator 9 (for example, the arm cylinder 114) through a control valve 8, and thus the actuator 9 is driven. The control valve 8 is operated by an operating lever 10 so as to control the flow of pressure oil from the hydraulic pump 7 to the actuator 9. The pump displacement is changed by a regulator 7a. The regulator 7a changes the pump displacement in accordance with a pump discharge pressure so as to perform, for instance, constant torque control that causes working torque to be constant. It is to be noted that the hydraulic pump 7 may be a fixed displacement pump such as a gear pump.

A controller 20 is configured to include an arithmetic processing unit having a CPU, a ROM, a RAM, other peripheral circuits, and the like. The controller 20 is input with a signal from each of an accelerator operation amount detector 21 that detects an operation amount of an accelerator pedal 11, a vehicle speed detector 22 that detects a rotational speed of the output shaft of the transmission 3, i.e., the vehicle speed, a rotational speed detector 23 that detects a rotational speed Ni of the input shaft of the torque converter 2, a rotational speed detector 24 that detects a rotational speed Nt of the output shaft of the torque converter 2, a pressure detector 25 that detects a discharge pressure P of the hydraulic pump 7, a manual/auto switch 26 that selects a manual shift mode in which the speed is shifted manually or an automatic shift mode in which the speed is shifted automatically, a forward and reverse movement changeover switch 27 that instructs forward movement or reverse movement of the vehicle, a speed step switch 28 that instructs an upper limit of a speed step between the first speed and the fourth speed, a kickdown switch 29 that instructs the speed step to be switched to a lower speed side, a main switch 30 that selects a power mode (hereinafter, the P mode) in which priority is given to workability or an economy mode (hereinafter, the E mode) in which priority is given to fuel economy, and a sub switch 31 that similarly selects the P mode or the E mode.

The torque converter 2 has a function to increase output torque over input torque, i.e., a function to make a torque ratio 1 or greater. The torque ratio is reduced with an increase in a torque converter speed ratio e (output rotational speed Nt/input rotational speed Ni), which is a ratio of the rotational speeds between the input shaft and the output shaft of the torque converter 2. For instance, when travel load is increased during traveling in a state where the engine rotational speed is constant, the output rotational speed Nt of the torque converter 2, i.e., the vehicle speed, is reduced and the torque converter speed ratio e is reduced. At this time, the torque ratio is increased, thereby allowing the vehicle to travel on a greater driving force (traction force). In other words, the lower the vehicle speed is, the greater the driving force is (low speed high torque) and the higher the vehicle speed is, the less the driving force is (high speed low torque).

The transmission 3 is an automatic transmission that has a solenoid valve corresponding to each speed step of the first speed to the fourth speed. These solenoid valves are driven by control signals that are output from the controller 20 to a solenoid control unit 12. In the controller 20, a torque converter speed ratio e1 that serves as a reference of shift up and a torque converter speed ratio e2 that serves as a reference of shift down are stored in advance.

In the automatic shift mode, the controller 20 calculates the torque converter speed ratio e by using signals from the rotational speed detectors 23 and 24, if the calculated speed ratio e exceeds the reference speed ratio e1, outputs a shift up signal to the solenoid control unit 12, and, if the calculated speed ratio e falls below the reference speed ratio e2, outputs a shift down signal to the solenoid control unit 12. This causes the speed step of the transmission 3 to be automatically shifted between the first speed and the fourth speed in accordance with the torque converter speed ratio e. At this time, the speed is automatically shifted with a speed step selected by the speed step switch 28 as an upper limit. For example, when the second speed is selected by the speed step switch 28, the speed step is set to the first speed or the second speed, and, when the first speed is selected, the speed step is fixed to the first speed.

It is to be noted that in the manual shift mode, the speed can be shifted to any speed step by a manual operation of a switch. In addition, the speed step can be shifted down by one step each time the kickdown switch 29 is operated. In the automatic shift mode, the speed step can be forcibly shifted down by operating the kickdown switch 29 when the vehicle speed is low for instance.

While in the above, it is arranged that the speed is shifted when the torque converter speed ratio e reaches a predetermined value, it may be arranged that the speed is shifted when the vehicle speed reaches a predetermined value. In that case, a shift up signal or a shift down signal may be output to the solenoid control unit 12 in accordance with a signal from the vehicle speed detector 22.

The controller 20 controls the engine rotational speed to be a target engine speed in accordance with an operation amount of the accelerator pedal 11. More specifically, when a depressing amount of the accelerator pedal 11 is increased, the target engine speed becomes higher and the controller 20 outputs a control signal corresponding to this target engine speed to an engine control unit 13, thereby controlling the engine rotational speed.

Figure 3:
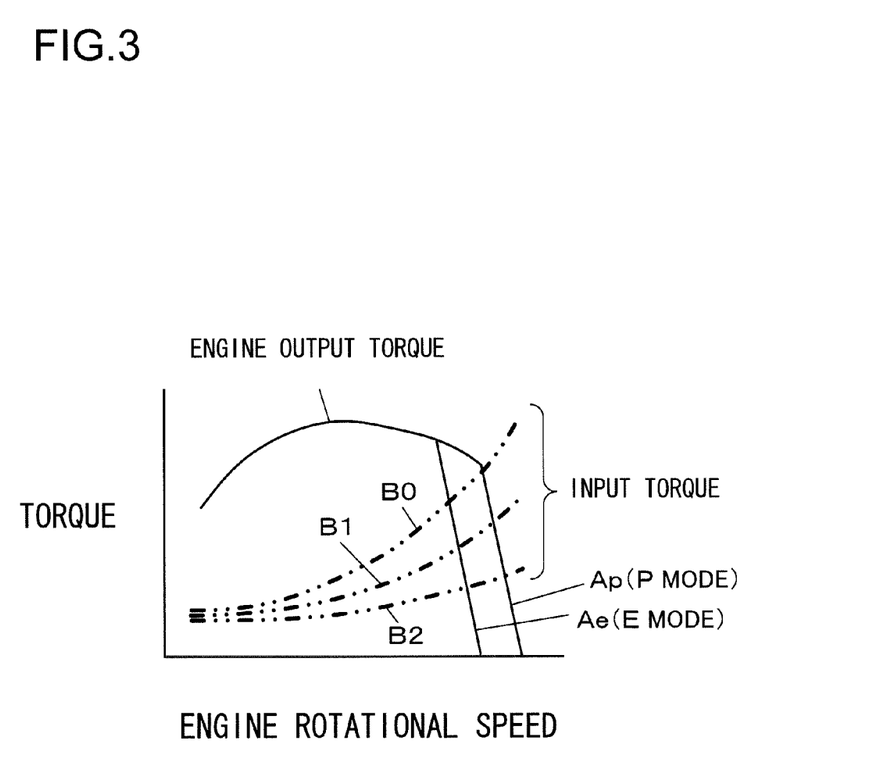
FIG. 3 is a traveling performance diagram showing a relationship between engine rotational speed and torque.

FIG. 3 is a traveling performance diagram (torque diagram) showing a relationship between engine rotational speed and torque when the accelerator pedal 12 is fully depressed. In the figure, characteristics Ap and Ae are torque diagrams when the travel modes are the P mode and the E mode, respectively. While in the P mode, the engine maximum rotational speed is not restricted, in the E mode, the engine maximum rotational speed is restricted to a lower speed side than that in the P mode.

Characteristics B0 to B2 are examples of input torque when the transmission 3 is driven by the engine 1, and the input torque is increased with rise of the engine rotational speed. This input torque includes input torque of the working hydraulic pump 7 and varies as represented by the characteristics B0 to B2 in accordance with the torque converter speed ratio e and absorption torque of the working hydraulic pump 7. More specifically, when the torque converter speed ratio e becomes high, the input torque is increased (the characteristic B0), and, when the torque converter speed ratio e becomes low, the input torque is reduced (the characteristic B2).

Intersections of the characteristics Ap and Ae and the characteristics B0 to B2 are matching points, and the engine rotational speed is at the value of the matching points. Due to this, an engine rotational speed in the P mode with respect to a given input torque is higher than that in the E mode. When the engine rotational speed is at the matching point, travel driving force is in proportion to the square of this engine rotational speed N. As a result, travel driving force becomes greater in the P mode than that in the E mode, and the maximum vehicle speed is higher in every speed step as the engine rotational speed is higher in the P mode.

Figure 4:
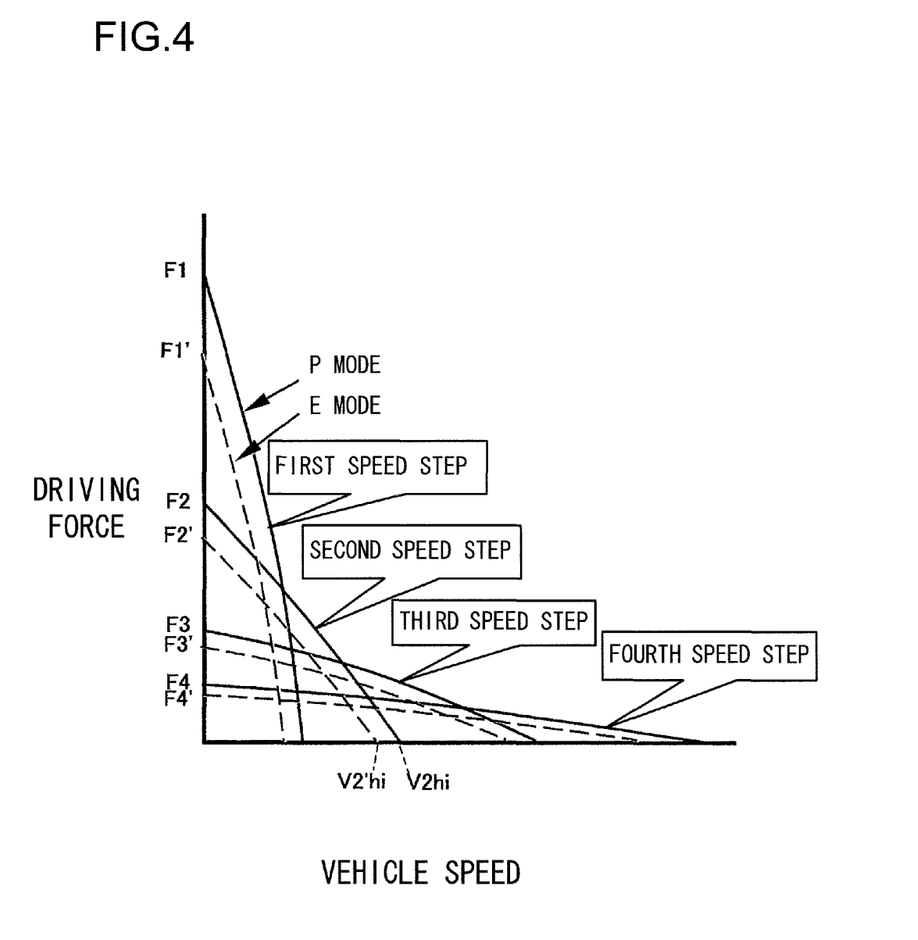
FIG. 4 is a diagram showing a relationship between vehicle speed and travel driving force in each speed step.

FIG. 4 is a diagram showing a relationship between vehicle speed and travel driving force in each speed step. In the figure, the solid lines represent the characteristics in the P mode and the dotted lines represent the characteristics in the E mode. Comparing at the same speed step, the lower the vehicle speed is, the greater the driving force is (low speed high torque) and the higher the vehicle speed is, the less the driving force is (high speed low torque). In addition, the lower the speed step is, the greater driving force can be achieved at the same vehicle speed. The maximum driving force is greater in the P mode than that in the E mode and so is the maximum vehicle speed. For example, a maximum driving force F2 in the P mode in the second speed step is greater than a maximum driving force F2' in the E mode, and a maximum vehicle speed V2hi in the P mode is higher than a maximum vehicle speed V2'hi in the E mode.

Figure 5:
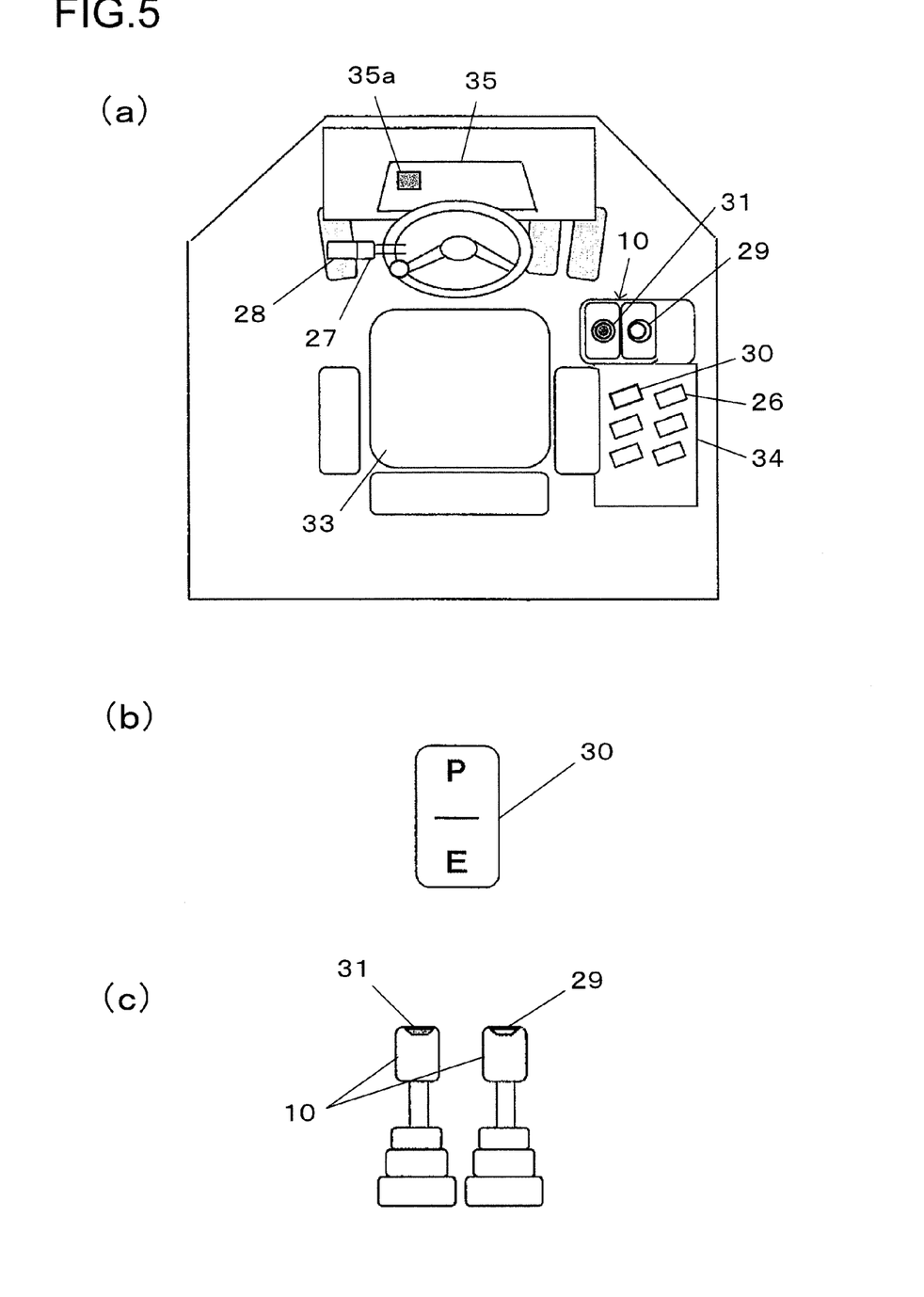

FIG. 5 (a) is a plan view showing a structure in the driver cabin 121. The manual/auto switch 26 and the main switch 30 are arranged on a side console panel 34 on the right side of a driver seat 33 and the pair of operating levers 10 are arranged in front of the side console 34. The main switch 30 is an alternate switch that can be switched between the P position and the E position as shown in FIG. 5 (b). As shown in FIG. 5 (c), the kickdown switch 29 is provided on the top of the gripper of one of the operating levers 10 and the sub switch 31 is provided on the top of the gripper of the other. The kickdown switch 29 and the sub switch 31 are momentary switches. A monitor panel 35 is provided in front of the driver seat 33, and the monitor panel 35 is provided with a display section 35a displaying which of the E mode and the P mode is selected.

Figure 6:
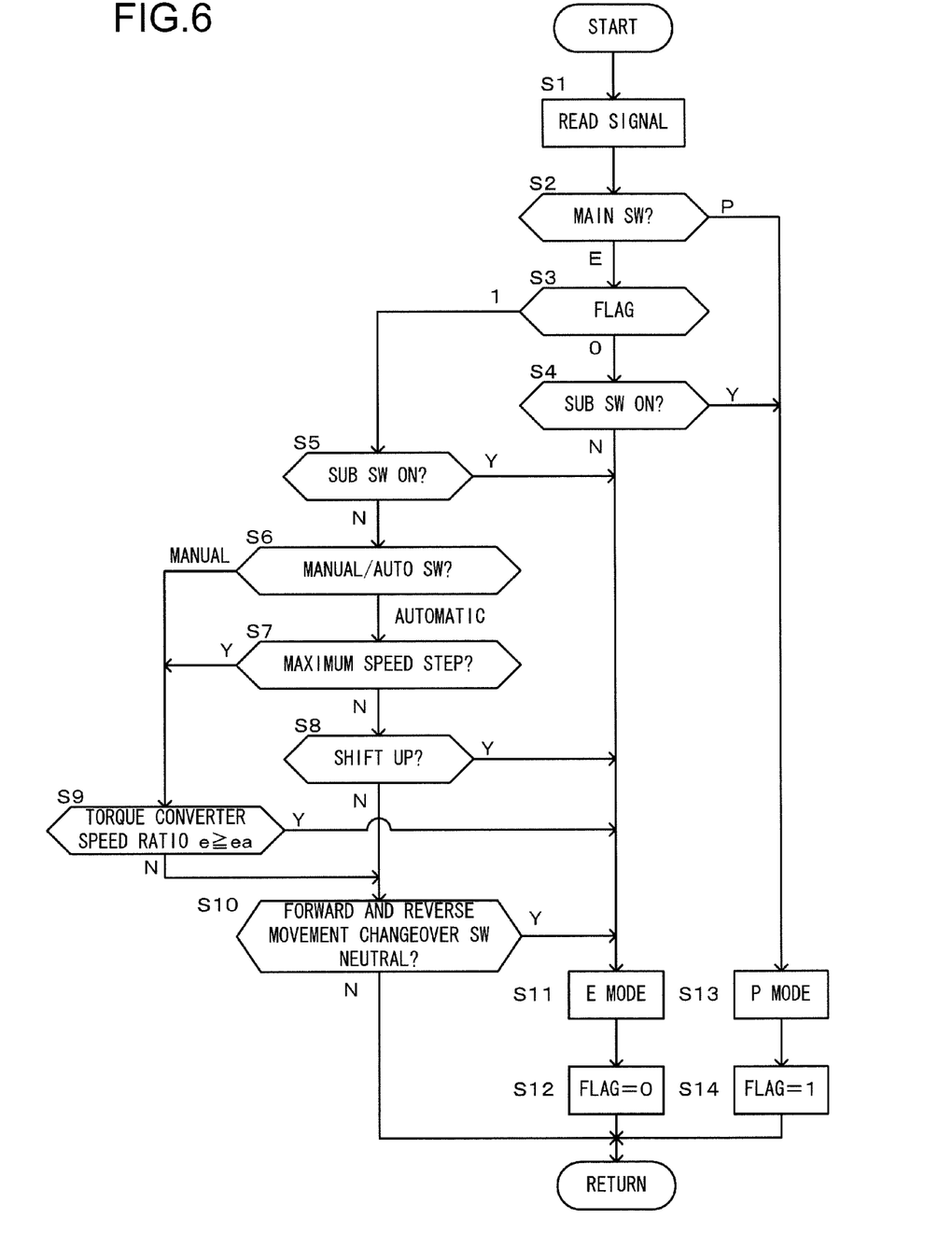
FIG. 6 is a flowchart showing an example of processing executed by a controller of FIG. 2.

Switching of the E mode and the P mode will be explained. FIG. 6 is a flowchart showing an example of processing executed by the controller 20. The processing shown in this flowchart is initiated by, for instance, turning on an engine key switch that is not shown in the figures. In a step S1, signals from the variety of detectors 21 to 25 and the switches 26 to 31 are read. In a step S2, a decision is made on the travel mode by an operation of the main switch 30.

If a decision is made in the step S2 that the P mode has been selected, the flow of control proceeds to a step S13, where the travel mode is set to the P mode. This causes a control signal to be output to the engine control unit 13 so that the traveling performance diagram when the pedal is fully depressed becomes the characteristic Ap of FIG. 3. At this time, the display section 35a of the monitor panel 35 displays that the P mode has been set as the travel mode. Next, a flag is set to 1 in a step S14, and the flow of control returns. On the other hand, if a decision is made in the step S2 that the E mode has been selected, the flow of control proceeds to a step S3.

In the step S3, a decision is made on the value of the flag. When the flag=0, i.e., the travel mode is the E mode, the flow of control proceeds to a step S4, where a decision is made as to whether or not the sub switch 31 is on, i.e., as to whether or not the sub switch 31 has been press-operated. If a positive decision is made in the step S4, the flow of control proceeds to the step S13, and, if a negative decision is made therein, the flow of control proceeds to a step S11. In the step S11, the travel mode is set to the E mode. This causes a control signal to be output to the engine control unit 13 so that the traveling performance diagram when the pedal is fully depressed becomes the characteristic Ae of FIG. 3. At this time, the display section 35a of the monitor panel 35 displays that the E mode has been set as the travel mode. Next, the flag is set to 0 in a step S12, and the flow of control returns.

When the flag=1 in the step S3, i.e., the travel mode is the P mode, the flow of control proceeds to a step S5. In the step S5, a decision is made as to whether or not the sub switch 31 is on. If a positive decision is made in the step S5, the flow of control proceeds to the step S11, and, if a negative decision is made therein, the flow of control proceeds to a step S6. In the step S6, a decision is made as to which of the automatic shift mode and the manual shift mode has been selected by an operation of the manual/auto switch 26.

If a decision is made in the step S6 that the automatic shift mode has been selected, the flow of control proceeds to a step S7, where a decision is made as to whether or not a current speed step is a maximum speed step set by the speed step switch 28. If a negative decision is made in the step S7, the flow of control proceeds to a step S8, where a decision is made as to whether or not the torque converter speed ratio e has exceeded a predetermined value e1 so that a shift up signal has been output to the solenoid control unit 12. If a positive decision is made in the step S8, the flow of control proceeds to the step S11, and, if a negative decision is made therein, the flow of control proceeds to a step S10.

In the step S10, a decision is made as to whether or not neutral has been instructed by a signal from the forward and reverse movement changeover switch 27. For instance, when the movement is switched from forward travel to reverse travel, the forward and reverse movement changeover switch 27 passes through a neutral position, and therefore a positive decision is made in the step S10. If a positive decision is made in the step S10, the flow of control proceeds to the step S11, and, if a negative decision is made therein, the flow of control returns.

On the other hand, if a decision is made in the step S6 that the manual shift mode has been selected or a decision is made in the step S7 that the speed step is the maximum speed step, the flow of control proceeds to a step S9. In the step S9, a decision is made as to whether or not the torque converter speed ratio e is equal to or greater than a predetermined value ea (for example, 0.8). If a positive decision is made in the step S9, the flow of control proceeds to the step S11, and, if a negative decision is made therein, the flow of control proceeds to the step S10.

The above operation is summarized as follows. Upon switching the main switch 30 to the P mode, the travel mode is set to the P mode (the step S13). At this time, the maximum rotational speed of the engine 1 is not restricted, the travel driving force becomes great, and the maximum vehicle speed becomes high. Upon switching the main switch 30 to the E mode, on the other hand, the travel mode is set to the E mode (the step S11). At this time, the maximum rotational speed of the engine 1 is restricted to a lower speed side and the travel driving force and the maximum vehicle speed are reduced, thereby improving fuel economy.

Figure 7:
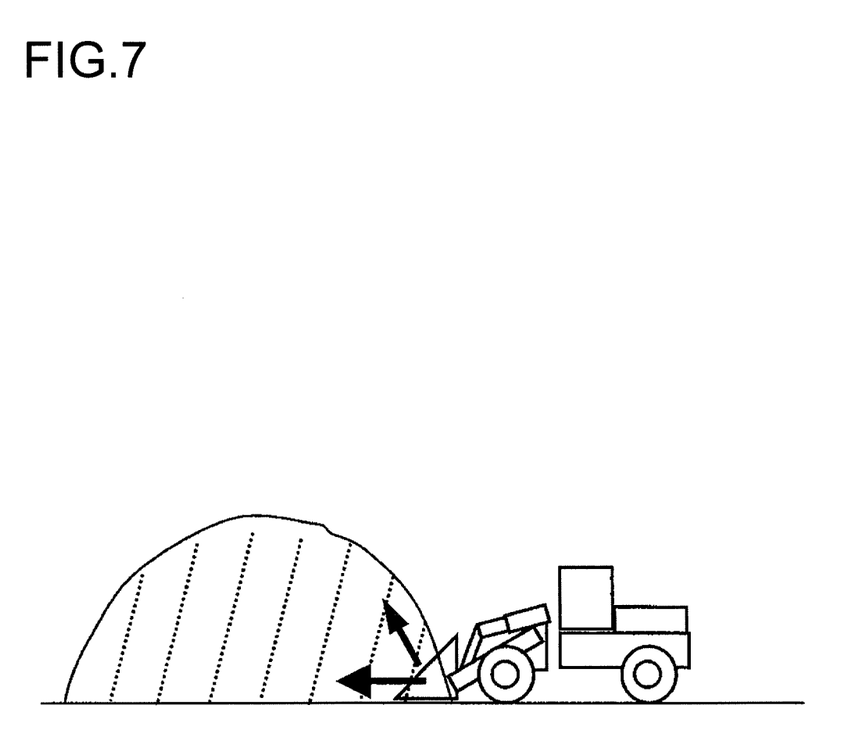
FIG. 7 is a view showing an excavation work state.
Figure 8:
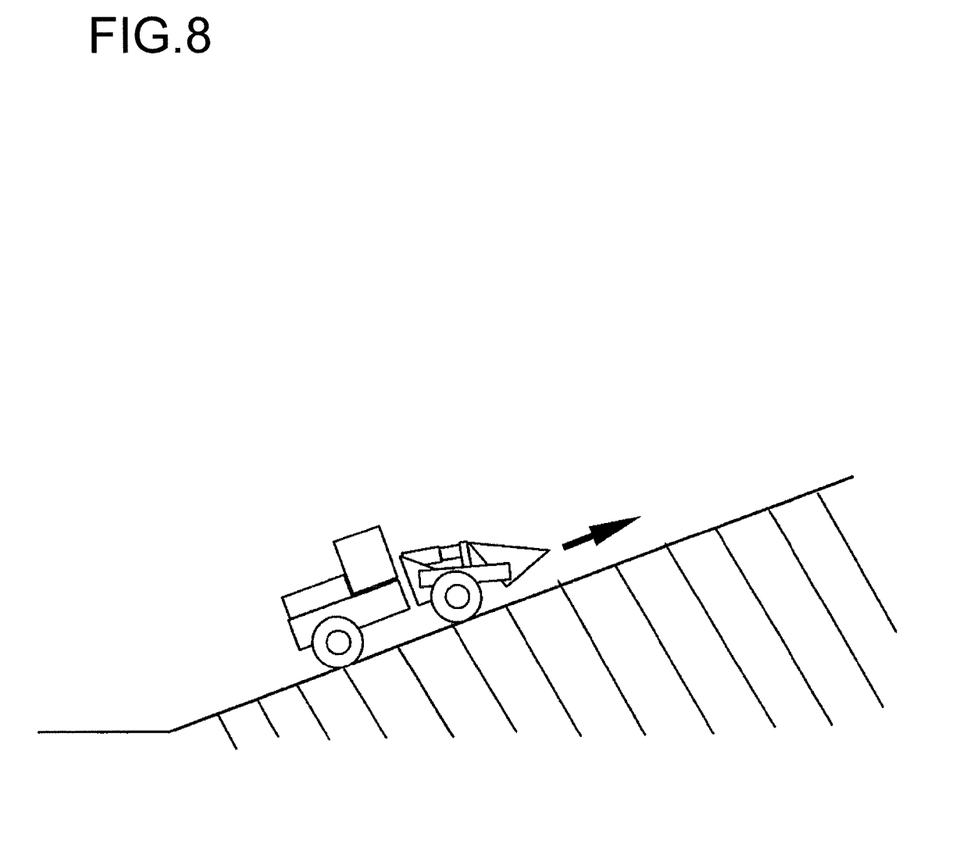
FIG. 8 is a view showing an uphill traveling state.
Figure 9:
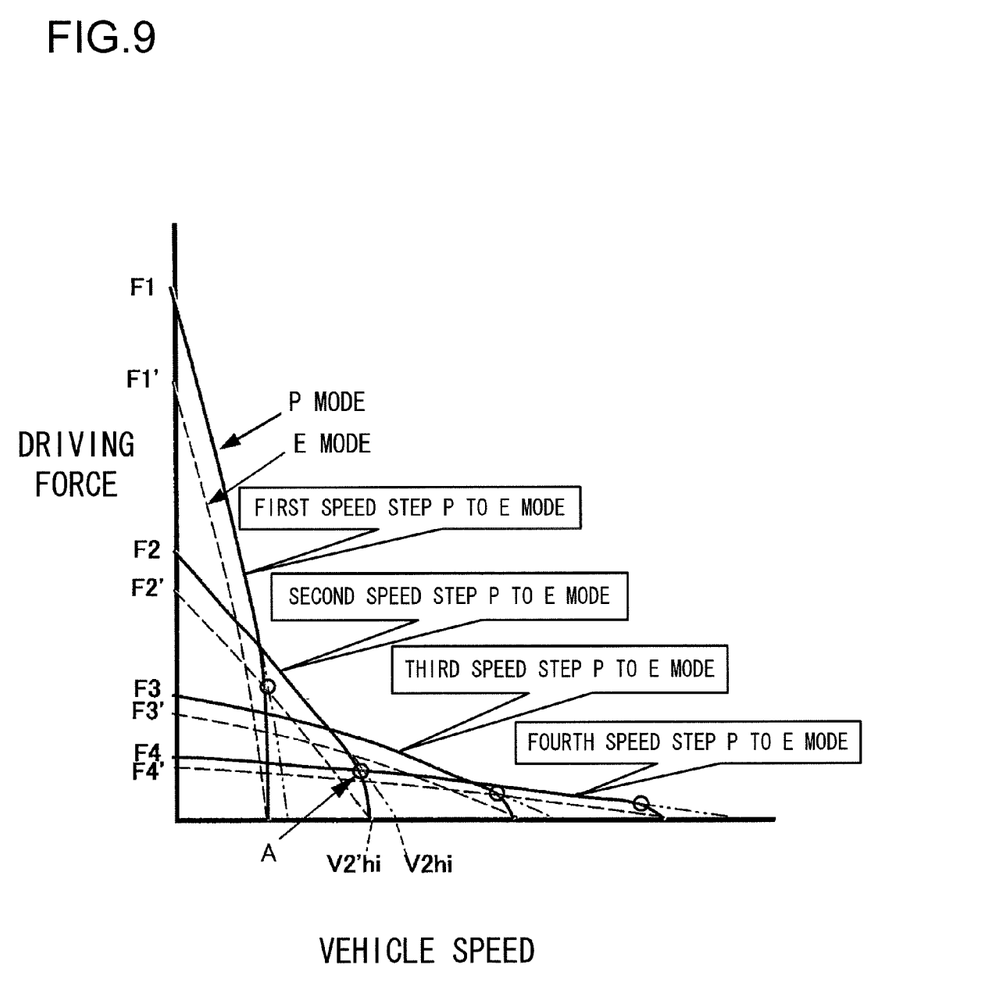
FIG. 9 is a diagram showing an example of operations in the present embodiment.

If a greater travel driving force is required during traveling in the E mode, the travel mode is switched to the P mode by press-operating the sub switch 31 (the step S4 to the step S13). Due to this, in excavation work as shown in FIG. 7 for example, there is no need for an operator to release his/her hand from the operating levers 10 to operate the main switch 30 to the P mode, thereby improving workability. In addition, since the travel mode is immediately switched to the P mode by press-operating the sub switch 31 regardless of the speed step, the travel driving force can be temporarily increased by the operation on the sub switch 31 during uphill travel as shown in FIG. 8 in the second speed for instance.

The controller 20, in a state where the P mode has been set by an operation on the sub switch 31, makes a decision as to whether a mode switching condition is established in accordance with a vehicle state of the wheel loader 100 or an operation on the sub switch 31. Then, as explained below, upon making a decision that the mode switching condition is established, the controller 20 switches the travel mode from the P mode to the E mode.

After the travel mode is switched to the P mode by an operation on the sub switch 31, if the sub switch 31 is press-operated once again, the controller 20 makes a decision that the mode switching condition is established and the travel mode is switched to the E mode (the step S5 to the step S11). This allows the travel mode to be arbitrarily switched as desired by the operator in a state where the main switch 30 remains switched to the E mode.

In the automatic shift mode, after the travel mode has been switched to the P mode by an operation on the sub switch 31, when the torque converter speed ratio e becomes greater than e1 and the speed step is shifted up, the controller 20 makes a decision that the mode switching condition is established and the travel mode returns to the E mode (the step S8 to the step S11). Due to this, after the travel mode is switched to the P mode by an operation on the sub switch 31 during uphill travel for example, if travel load is reduced and the speed step is shifted up, the travel mode automatically returns to the E mode, and therefore a bothersome switch operation is unnecessary. In addition, there is no need to travel in the P mode more than necessary, which is efficient.

Also in the manual shift mode, after the travel mode has been switched to the P mode by an operation on the sub switch 31, when the torque converter speed ratio e becomes equal to or greater than the predetermined value ea, the controller 20 makes a decision that the mode switching condition is established and the travel mode returns to the E mode (the step S9 to the step S11). This enables an efficient travel without a switch operation. The relationship between the vehicle speed and the driving force in this case is as shown by the solid lines in FIG. 9 with respect to the normal characteristics in the P mode shown by the two-dot chain lines. For instance, if the torque converter speed ratio e reaches the predetermined value ea at a point A in the figure during traveling in the second speed, the driving force is reduced from the characteristic of the P mode so as to approach or return to the characteristic of the E mode as shown in the figure. It is to be noted that also during traveling in the maximum speed step in the automatic shift mode, if the torque converter speed ratio e becomes equal to or greater than the predetermined value ea, the controller 20 makes a decision that the mode switching condition is established and similarly the travel mode returns to the E mode (the step S7 to the step S9 to the step S11).

After the travel mode is switched to the P mode by an operation on the sub switch 31, if the forward and reverse movement changeover switch 27 is operated to the neutral position, the controller 20 makes a decision that the mode switching condition is established and the travel mode returns to the E mode (the step S10 to the step S11). Due to this, in a state where the travel mode is switched to the P mode by an operation on the sub switch 31 for instance, if the vehicle travels forwards so as to put the bucket 112 into the mound and then travels rearwards, the travel mode automatically returns to the E mode, thereby achieving a good excavation work.

When the travel mode is set to the P mode by operations on the main switch 30 and the sub switch 31, an indication of such is displayed on the display section 35a, and when the travel mode is set to the E mode, an indication of such is displayed on the display section 35a. This allows the operator to recognize the current travel mode with ease and to correctly set a desired travel mode.

The following operations and advantageous effects can be achieved according to the present embodiment.

(1) It is arranged that if the E mode is selected by an operation on the sub switch 31 in a state where the E mode is selected by an operation on the main switch 30, the maximum rotational speed of the engine 1 is restricted to a lower speed side.

(2) If the sub switch 31 is operated in a state where the E mode has been selected, the travel mode is switched to the P mode regardless of travel speed step, thereby temporarily providing the power even in a state of travel in the second speed or higher. This allows the travel driving force to be increased temporarily, thereby increasing workability in excavation work and the like and mobility in uphill travel and the like.

(3) It is arranged that if the sub switch 31 is operated once again in a state where the P mode has been selected by an operation on the sub switch 31, the travel mode is returned to the E mode. As a result, the travel mode can be arbitrarily switched or selected as desired by the operator.

(4) It is arranged that in a state where the P mode has been selected by an operation on the sub switch 31, if a shift up signal is output in the automatic shift mode or if the torque converter speed ratio e becomes equal to or greater than the predetermined value ea in the manual shift mode, the travel mode is automatically returned to the E mode, thereby enabling efficient traveling without a bothersome switch operation.

(5) It is arranged that in a state where the P mode has been selected by an operation on the sub switch 31, if the forward and reverse movement changeover switch 27 is operated to the neutral position, the travel mode is automatically returned to the E mode, thereby allowing excavation work in which a forward operation and a reverse operation are repeated to be performed efficiently.

(6) Since the sub switch 31 is provided on the operating lever 10 as a momentary switch, the travel mode can be temporarily switched from the E mode to the P mode without the operator releasing his/her hand from the operating lever 10.

(7) Since the sub switch 31 is provided separately from the kickdown switch 29, a mode switching instruction can be output separately from a kickdown instruction.

(8) Since it is arranged that the travel mode setting is displayed on the display section 35a, the operator is allowed to recognize the current travel mode with ease and to correctly set to a desired travel mode.

It is to be noted that while in the above embodiment, it is arranged that based upon an operation on the sub switch 31, output of a shift up signal, the torque converter speed ratio e being equal to or greater than the predetermined value ea, or a neutral operation on the forward and reverse movement changeover switch 27, the controller 20 makes a decision as to whether or not switching from the E mode to the P mode is necessary, the structure on a determination means is not limited to that. While it is arranged that an operation on the sub switch 31, output of a shift up signal, the torque converter speed ratio e being equal to or greater than the predetermined value ea, and a neutral operation on the forward and reverse movement changeover switch 27 are mode switching conditions, another mode switching condition may be set. In other words, any structure may be adopted in the mode switching means as long as the travel mode is caused to return to the E mode when the mode switching condition is established.

The structures of the main switch 30 as a first selection means and the sub switch 31 as a second selection means are not limited to those described above. While it is arranged that a control signal is output from the controller 20 to the engine control unit 13 so that the maximum rotational speed of the engine 1 is not restricted when the P mode has been selected and so that the maximum rotational speed of the engine 1 is restricted to a lower speed side when the E mode has been selected, it may be arranged that the engine maximum rotational speed is restricted in the P mode on a higher speed side than that in the E mode. In other words, the structure of a speed restriction means is not limited to that described above as long as the maximum rotational speed of the engine 1 is restricted in the E mode to a lower speed side than that in the P mode.

While it is arranged that the torque converter speed ratio e is detected by using the rotational speed detectors 23 and 24, any structure may be adopted in a speed ratio detection means. While it is arranged that rotation of the engine 1 is transmitted to the tires 6 through the torque converter 2, the transmission 3, the propeller shaft, and the axles 5, any structure may be adopted in a travel drive device. While the kickdown switch 29 as a low-speed instruction means is provided on the operating lever 10, which is a working operation member, the kickdown switch 29 may be provided on another section as long as it is provided separately form the sub switch 31.

While an example in which the present invention is applied to a wheel loader has been explained so far, the present invention can be similarly applied to another working vehicle that can switch the travel mode between the E mode and the P mode. In other words, the present invention is not limited to the motor control device for a working vehicle of the embodiment as long as the features and the functions of the present invention can be achieved.

While a variety of embodiment and variations have been explained so far, the present invention is not to be limited to those contents. Other aspects that may be conceived of within the range of the technical concept of the present invention are also included within the range of the present invention.

The disclosure of the following priority application is herein incorporated by reference: Japanese Patent Application No. 2009-146200 filed on Jun. 19, 2009.

The invention claimed is:

1. A motor control device for a working vehicle, comprising:
   a travel drive device that transmits rotation of a motor to wheels through a torque converter;
   a first selection device to be operated so as to select one of a power mode and an economy mode;
   a second selection device that is different from the first selection device;
   a mode switching device that switches from the economy mode to the power mode if the second selection device is operated in a state where the economy mode has been selected by the first selection device; and
   a speed restriction device that, when the economy mode is set, restricts a maximum rotational speed of the motor to a lower speed side than that when the power mode is set.

2. A motor control device for a working vehicle according to claim 1, further comprising:
   a determination device that making a decision as to whether a mode switching condition is established in accordance with one of a vehicle state of the working vehicle and an operation on the second selection device, wherein:
   the mode switching device switches from the power mode to the economy mode if the determination device makes a decision that a mode switching condition is established in a state where the power mode has been selected by an operation on the second selection device.

3. A motor control device for a working vehicle according to claim 2, further comprising:
   a speed ratio detection device that detects a speed ratio of the torque converter, wherein:
   the determination device makes a decision that a mode switching condition is established if the torque converter speed ratio detected by the speed ratio detection device becomes equal to or greater than a predetermined value.

4. A motor control device for a working vehicle according to claim 2, wherein:
   the determination device makes a decision that a mode switching condition is established if the second selection device is operated again in a state where the power mode has been set by an operation on the second selection device.

5. A motor control device for a working vehicle according to claim 2, wherein:
   the determination device makes a decision that a mode switching condition is established if, in a state where a transmission has been set to an automatic shift mode, a shift up signal is output to the transmission.

6. A motor control device for a working vehicle according to claim 2, wherein:
   the determination device makes a decision that a mode switching condition is established if a forward and reverse movement changeover switch, by which an instruction of any of forward, reverse, and neutral of the working vehicle is given, is operated to a neutral position.

7. A motor control device for a working vehicle according to claim 1, wherein:
   the first selection device is an alternate switch provided in a driver cabin; and the second selection device is a momentary switch provided to a working operation member that outputs a drive instruction to a working actuator in accordance with an operation amount.

8. A motor control device for a working vehicle according to claim 1, further comprising:
a low-speed instruction device that instructs a speed step to be switched to a low speed side and that is separated from the second selection device.

* * * * *